US012774713B2

(12) United States Patent
Daly et al.

(10) Patent No.: US 12,774,713 B2
(45) Date of Patent: Oct. 27, 2026

(54) DRYWALL ANCHOR AND METHOD FOR INSTALLING A DRYWALL ANCHOR

(71) Applicant: fischerwerke Gmbh & Co. KG, Waldachtal (DE)

(72) Inventors: Aaron Daly, Pfalzgrafenweiler (DE); Philipp Duffner, Starzach-Bierlingen (DE); Christian Frey, Freudenstadt-Wittlensweiler (DE)

(73) Assignee: Fischerwerke GmbH & Co. KG, Waldachtal (DE)

( * ) Notice: Subject to any disclaimer, the term of this patent is extended or adjusted under 35 U.S.C. 154(b) by 311 days.

(21) Appl. No.: 18/654,165

(22) Filed: May 3, 2024

(65) Prior Publication Data

US 2025/0075722 A1 Mar. 6, 2025

(30) Foreign Application Priority Data

Sep. 4, 2023 (DE) ..................... 10 2023 123 729.2
Jan. 31, 2024 (DE) ..................... 10 2024 102 663.4

(51) Int. Cl.
*F16B 13/00* (2006.01)

(52) U.S. Cl.
CPC .................................. *F16B 13/002* (2013.01)

(58) Field of Classification Search
CPC ..................................................... F16B 13/002
USPC ........................................................... 411/29
See application file for complete search history.

(56) References Cited

U.S. PATENT DOCUMENTS 5,630,688 A * 5/1997 Tran ...................... F16B 13/002 411/395
7,762,751 B2 7/2010 Panasik et al.
10,933,477 B1 3/2021 Patel
2006/0127199 A1 6/2006 Bappert
2006/0165506 A1* 7/2006 Panasik ................ F16B 13/002 411/30
2006/0245841 A1* 11/2006 Ernst ..................... F16B 13/066 411/30
2020/0173479 A1 6/2020 Sunkara
2021/0040971 A1 2/2021 Pirozzi (Continued)

FOREIGN PATENT DOCUMENTS

CA 2876971 C * 11/2020 ............ F16B 13/002
DE 10 2020 107 225 A1 10/2021
EP 1669615 A1 * 6/2006 ............ F16B 13/002

(Continued)

OTHER PUBLICATIONS

English translation of French Patent Application Publication No. FR 2653503 (Jan. 24, 1992) (Year: 1992).*

(Continued)

*Primary Examiner* — Jason D Shanske
(74) *Attorney, Agent, or Firm* — Renner, Otto, Boisselle & Sklar, LLP

(57) ABSTRACT

A drywall anchor to be introduced into a gypsum plaster board in a self-drilling manner, and to a method for installing the drywall anchor. The drywall anchor comprises a base body and a drilling element. The drilling element comprises a drilling tip and a cutting element including a cutting bit as well as a hollow, crucible-shaped core bit, which is open toward the front and within which the cutting element is disposed, the cutting element protruding to the front beyond the bit.

17 Claims, 6 Drawing Sheets

(56) References Cited

U.S. PATENT DOCUMENTS

| | | | | |
|---|---|---|---|---|
| 2022/0225796 | A1* | 7/2022 | Daly | A47G 1/164 |
| 2025/0075721 | A1* | 3/2025 | Daly | F16B 25/0026 |

FOREIGN PATENT DOCUMENTS

| | | | |
|---|---|---|---|
| EP | 3 577 350 | B1 | 7/2022 |
| FR | 2653503 | B1 | 1/1992 |

OTHER PUBLICATIONS

Search Report for related German Patent Application No. 10 2023 123 730.6, dated Apr. 12, 2024.

International Search Report issued for related International Application No. PCT/EP2024/073627, mailed Nov. 14, 2024.

* cited by examiner

DRYWALL ANCHOR AND METHOD FOR INSTALLING A DRYWALL ANCHOR

This application claims priority under 35 USC § 119 to German Patent Application No. DE 10 2023 123 729.2, filed Sep. 4, 2023, and German Patent Application No. DE 10 2024 102 663.4, filed Jan. 31, 2024, the entire disclosures of which are incorporated herein by reference.

TECHNICAL FIELD OF THE INVENTION

The invention relates to a drywall anchor as well as to a method for installing the drywall anchor.

A drywall anchor of the type in question to be screwed into a gypsum plaster board in a self-drilling manner is known from the patent specification U.S. Pat. No. 7,762,751 B2. The drywall anchor includes a cylindrical base body including an external thread. A drilling element, which has a central drilling tip and a cutting bit including two cutting sections that extend radially with respect to a longitudinal axis from the drilling tip to the outside, is disposed in one piece at the front end of the base body. The cutting sections extend, at an incline with respect to the longitudinal axis, forwardly starting from the drilling tip to the rear and the outside, away from the longitudinal axis. When the drywall anchor is screwed in in a self-drilling manner, a drill hole is drilled into the gypsum plaster board by way of the drilling element. After the drill hole has been drilled, the known drywall anchor is screwed into the drill hole until a flange, which is disposed so as to extend around the rear end of the base body, rests against an outer side of the gypsum plaster board. For fastening an attachment part, such as a hook, for example, to the gypsum plaster board, the attachment part is placed onto the flange, and a screw is screwed into a screw channel of the base body. The base body consequently spreads apart in a slotted region, breaking up at a predetermined breaking point in a front region of the base body, into two spreading bodies which latchingly engage a rear side of the gypsum plaster board so that the drywall anchor, and thus the attachment part, is securely and reliably fastened to the gypsum plaster board.

Another drywall anchor is known from the European patent EP 3 577 350 B1. This anchor includes a metal blade, serving as a drilling element, which is connected to the base body of this anchor in an axially fixed and non-rotatable manner by insert molding. This drilling element also includes a drilling tip and a cutting bit including two cutting sections that extend radially with respect to a longitudinal axis to the outside.

In addition, a drywall anchor is known from the unexamined patent application DE 10 2020 107 225 A1, in which, in contrast to the two drywall anchors described above, the drilling element is not permanently fixedly connected to the base body. In this drywall anchor, a reusable tool is pushed through the base body for installing the drywall anchor. The part of the tool which protrudes to the front beyond the front end of the base body forms a cutting element including a drilling tip and a cutting element at the front end thereof, for drilling a drill hole into the gypsum plaster board.

SUMMARY OF THE INVENTION

It is the object of the invention to create a drywall anchor to be screwed in in a self-drilling manner, having improved installation.

The drywall anchor according to the invention to be introduced into a gypsum plaster board in a self-drilling manner includes a base body and a drilling element. In particular, the drywall anchor additionally includes an external thread for cutting into the gypsum plaster board, which is provided at the base body so that the drywall anchor can be screwed into the gypsum plaster board in a self-drilling manner.

"Introduction in a self-drilling manner" shall be understood to mean that the drywall anchor according to the invention is suitable for creating a drill hole when being introduced into the gypsum plaster board, in which the drywall anchor is fastened, in particular by screwing in the external thread. The creation of the drill hole and the introduction of the drywall anchor into the drill hole are carried out in one installation step, which is to say without any planned interruption and without changing tools. For this purpose, the drywall anchor is placed with the drilling element at the front end onto a visible side of the gypsum plaster board. Then, the drywall anchor is turned, for example by way of a cordless screwdriver, about the longitudinal axis thereof and pushed against the gypsum plaster board. The drilling element cuts the drill hole into the board into which the drywall anchor is introduced, in particular, screwed. During screwing-in, the external thread cuts into the gypsum plaster board in the region of the drill hole wall. A two-stage setting process, which includes pre-drilling of the drill hole and subsequent introduction and necessitates two installation steps, using different tools, and thus requires more effort and time expenditure, is thus avoided.

The drywall anchor extends from a rear end to a front end, along a longitudinal axis of the drywall anchor which, in particular, is also the longitudinal axis of the base body and that of the drilling element. At the rear end, which, in particular, also forms the rear end of the drywall anchor, the base body can include a tool holder for a turning tool. The tool holder can, for example, be designed as a hexagon socket or as a cross recess. A corresponding tool, for example a bit of a cordless screwdriver, can be inserted into the tool holder for turning the drywall anchor about the longitudinal axis thereof when introduced in a self-drilling manner. In particular, the drywall anchor, at the rear end thereof, may additionally include a flange which, in particular, is integrally connected to the base body and which, in particular, extends over the entire circumference of the base body. The flange serves to bear against a visible side of the gypsum plaster board and prevents the drywall anchor from being screwed-in too far into the gypsum plaster board. After installation as intended, the flange is flush with the visible side or rests thereon. In addition, the flange can transmit pressure forces to the gypsum plaster board, which are introduced from an attachment part that may rest on the flange into the drywall anchor. In particular, a screw channel is provided in the base body, which extends from the tool holder to the front end of the base body. The screw channel extends, in particular, axially and concentrically with respect to the longitudinal axis and can extend completely through the base body, up to the front end. The screw channel is used to receive a screw, by way of which an attachment part, for example a hook, can be fastened in the known manner to the drywall anchor, and thus to the gypsum plaster board. In addition, provided that the screw channel is open at the front end, the screw channel can receive a tool that forms the, or a part of the, drilling element, as is previously known from the prior art described at the outset.

If the drywall anchor includes an external thread, the external thread is, in particular, connected in an axially fixed and non-rotatable manner to a circumferential surface of the base body, in particular integrally, and extends helically around the longitudinal axis of the drywall anchor. In particular, the base body, the external thread and, if present, the flange are produced in one piece from plastic material using an injection molding process. The external thread is designed so as to cut independently into the gypsum plaster board when the drywall anchor is being screwed into the drill hole. For this purpose, the external thread, in particular, has a maximum thread height, which corresponds to 0.15 times to 0.75 times, and preferably 0.2 times to 0.5 times, the outside diameter of the base body at the rear end of the external thread.

The drilling element is disposed at the front end of the base body. In particular, the drilling element is integrally connected to the base body. In particular, the drilling element is made of plastic material and injection-molded together and in one piece with the base body, which allows the drywall anchor according to the invention to be produced easily and cost-effectively.

However, the drilling element can also be connected in an axially fixed and non-rotatable manner to the base body by insert molding, or can be placed as a separate tool through the base body, as is known from the prior art.

The drilling element includes a drilling tip and a cutting element including a cutting bit. The drilling tip, in particular, forms the front end of the drywall anchor. The cutting bit extends from radially inside to radially outside based on the longitudinal axis, in particular proceeding from the drilling tip, and in particular up to a radially outer edge of the cutting element. At the front end, the cutting bit preferably transitions into the drilling tip, which makes it easier to apply the cutting bit to the gypsum plaster board and to tap the gypsum plaster board with pinpoint precision. The cutting bit can extend in a curved manner and does not have to intersect the longitudinal axis. In particular, the cutting bit extends in a straight manner, and in particular radially with respect to the longitudinal axis, in particular in an axial plane with respect to the longitudinal axis and inclined with respect to a radial plane of the longitudinal axis. The cutting element is, in particular, plate-shaped, which is to say planar across an area, wherein the cutting bit is disposed at the front of the cutting element. The cutting bit preferably includes two cutting sections, each extending from radially inside to radially outside based on the longitudinal axis. In particular, the two cutting sections are located opposite one another, based on the longitudinal axis. In particular, the sections are located together in an axial plane. In particular, the two cutting sections are disposed mirror-symmetrically with respect to the longitudinal axis at the cutting element. In particular, the cutting element includes exactly one cutting bit including exactly two cutting sections.

According to the invention, the drilling element has a hollow, in particular crucible-shaped core bit, which is open toward the front, and in particular is hollow and cylindrical, and within which the cutting element is disposed. The outer wall of the crucible-shaped core bit is continuous and devoid of any openings or gaps. The cutting bit of the cutting element protrudes to the front beyond the front end of the core bit, so as to be applied to an outer side of a gypsum plaster board, extending forwardly to the core bit. The core bit thus does not impair pinpoint-precision application. It is additionally achieved by way of this system that material, which is removed when the drywall anchor is introduced into a gypsum plaster board in a self-drilling manner, which is to say, in particular drill dust, is received by the core bit, whereby the material is prevented from egressing into the surrounding area.

The cutting element preferably has a triangular design in the region of the cutting bit in an axial plane with respect to the longitudinal axis. In particular, the part of the cutting element protruding beyond the core bit forms a triangle in an axial plane. In this way, the drilling tip, in particular, forms the front end or the front corner of the triangular region of the cutting element. This configuration of the cutting element, combined with the hollow-cylindrical core bit, has proven to be particularly advantageous when drilling a drill hole into a gypsum plaster board.

It is furthermore preferred for the two cutting sections of the cutting bit to be inclined with respect to the longitudinal axis so as to include, together, an acute angle of 30 degrees to 120 degrees in an axial plane with respect to the longitudinal axis. In particular, the acute angle is between 45 degrees and 90 degrees, whereby the cutting but can easily penetrate into gypsum plaster board, but nonetheless is stable. In particular, each of the cutting sections has the same level of inclination with respect to the longitudinal axis.

In a preferred embodiment of the drywall anchor according to the invention, the cutting bit has an outside diameter that is smaller than the outside diameter of the core bit. In particular, the cutting element ends at an inner wall of the hollow-cylindrical core bit, wherein the cutting bit is preferably connected, in particular integrally, to the inner wall of the hollow-cylindrical core bit. In the region of the inner wall of the hollow-cylindrical core bit, the cutting bit can protrude to the front beyond the core bit. In particular, however, the cutting bit ends at the inner wall at the level of a front end of the core bit, or the core bit protrudes to the front beyond the rear end of the cutting bit, which improves the transport of the removed material into the hollow-cylindrical core bit.

In a further preferred embodiment of the drywall anchor according to the invention, the cutting element forms a wall that divides an interior space of the hollow-cylindrical core bit into two chambers. This embodiment has the advantage that the cutting element, which is, in particular, integrally connected on both sides to the inner wall of the core bit, is stabilized as a result of this connection, which improves the robustness of the drywall anchor according to the invention during drilling. This configuration does not impair the transport of the removed material into the interior space of the core bit.

It is furthermore preferred for the interior space of the core bit to be closed toward the base body. This prevents the removed material from finding its way from the interior space, through the base body, to the outside, to the user or into an area, for example a living area, from which the drywall anchor is introduced into the gypsum plaster board.

The core bit has a cylindrical jacket-shaped outer surface and/or a conical outer surface. The outer surface can be composed of a single cylindrical jacket-shaped or conical section, or can be assembled from several sections, for example a cylindrical jacket-shaped section and a conical section. “Conical” here, in particular, means a frustum-shaped jacket surface. However, the term “conical” shall also encompass frustums of a pyramid here and, generally speaking, curved areas, the cross-sectional surface of which decreases toward the front along the longitudinal axis. Preferred, however, is a frustum-shaped jacket surface, which is inclined by between 2 degrees and 10 degrees with respect to the longitudinal axis. In another preferred embodiment, the non-circular base body may also incorporate a conical outer surface proximal to the peripheral flange.

The core bit preferably includes at least one milling element at the outer surface thereof, which reams the drill hole in a cutting and/or milling manner when the drill hole is being drilled. In particular, at least two groove-like pockets are formed, serving as milling elements. The pockets extend, in particular, from axially forward to axially rearward, and in particular over the entire length of the core bit. The pockets improve the cutting behavior of the core bit, while also serving to receive removed material, unless the material is being transported to the inside, into the interior space of the core bit.

The core bit itself is preferably designed as a hole saw, which is to say as a saw blade extending around the longitudinal axis, which has at least two saw teeth. The saw teeth are, in particular, disposed rotationally symmetrically with respect to the longitudinal axis in, in particular four to eight, in particular six pieces. The front ends of the saw teeth form the front end of the core bit. So as to ensure that material that is removed by way of the saw teeth when the drill hole is being drilled into the gypsum plaster board finds its way into the interior space of the core bit, the front ends of the saw teeth which form the cutting surfaces of the saw teeth are inwardly inclined. This means that the cutting surfaces of the saw teeth extend from the outside at the front to the inside at the rear.

The base body is in particular slotted, which is to say has at least one slit that extends radially through the entirety of the base body. In particular, the slit extends transversely to the longitudinal axis in a front section. In particular, the slit extends in a straight manner in a rear region of the slit, in particular parallel to the longitudinal axis, and transversely to the longitudinal axis in a front region, which allows favorable spreading behavior when a screw is being screwed into the screw channel. The slit forms two spreading bodies at the base body, which are, in particular, connected to one another by a predetermined breaking point, in particular at the front end of the slit. The slit does not extend over the entire length of the base body and, in particular, not to the front end thereof so that removed material that was received by the core bit cannot find its way into the slit, and from the slit to the outside.

In the method according to the invention for installing the drywall anchor according to the invention, a fastening system is created which includes the drywall anchor and a gypsum plaster board. When the drywall anchor according to the invention is being screwed into the gypsum plaster board, initially a drill hole, or a part of a drill hole, is drilled into the gypsum plaster board by way of the cutting element of the drilling element, and thereafter, the drill hole is recut by way of the core bit of the drilling element, and in particular by way of the cutting teeth. Removed material that results when the drill hole is drilled and recut is preferably received in an interior space of the core bit, and at least some of the material, which can thus not find its way to the outside, in an area from which a user introduces the drywall anchor according to the invention into the gypsum plaster board. At the beginning of the installation process, the drilling tip, and in particular additionally a front part of the cutting element, can be pushed into the gypsum plaster board. This keeps the distance between the core bit and the gypsum plaster board as small as possible. Material that is removed during drilling can thus only egress to the outside in the short time period until the core bit rests against the gypsum plaster board. It is thus preferred that the drilling element is designed so as to be pushed into the gypsum plaster board as far as possible, and preferably so far that the core bit already rests against the gypsum plaster board at the beginning of the drilling process.

The features and feature combinations, embodiments and configurations of the invention mentioned above in the description, and the features and feature combinations mentioned hereafter in the description of the figures and/or shown in a figure, can be used not only in the respective indicated or illustrated combination, but also in other essentially arbitrary combinations, or alone. Embodiments of the invention that do not include all the features of a dependent claim are possible. It is also possible to replace individual features of a claim with other disclosed features or feature combinations. Embodiments of the invention that do not include all the features of the exemplary embodiment are possible.

BRIEF DESCRIPTION OF THE DRAWINGS

The invention will be described hereafter in greater detail based on two exemplary embodiments shown in the drawings.

In the drawings.

Identical parts are denoted by the same reference numerals in the figures.

DETAILED DESCRIPTION OF THE INVENTION

Figure 1:
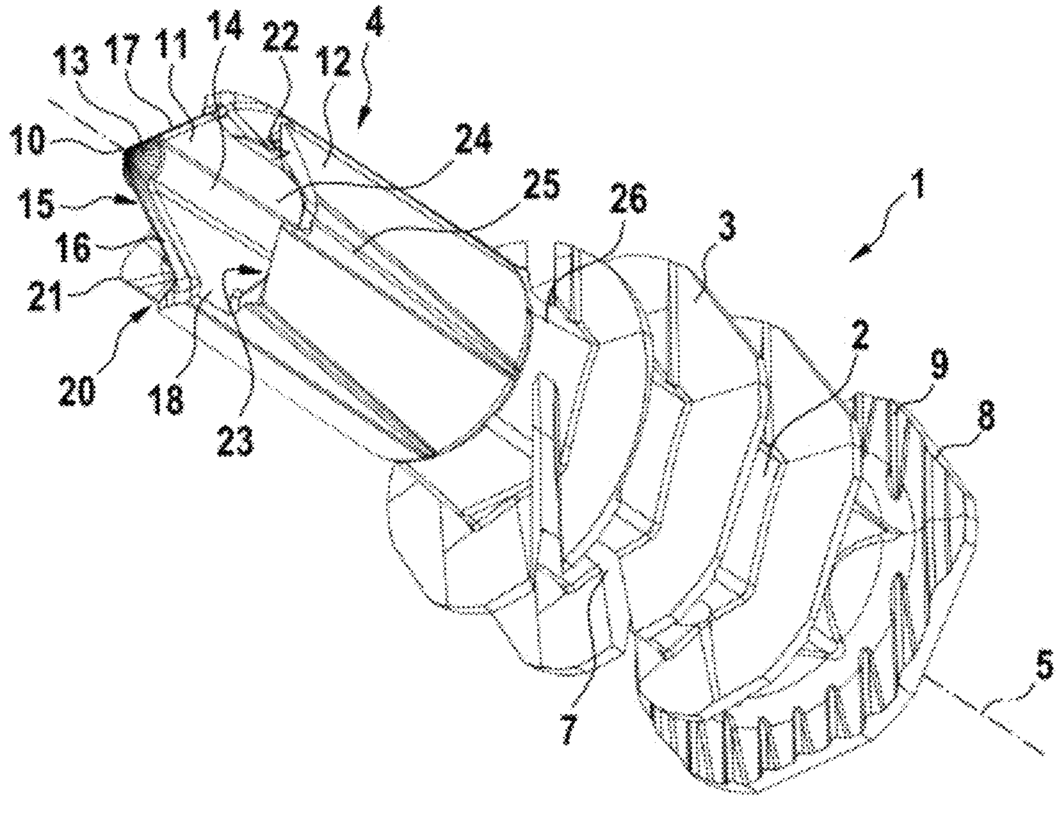
FIG. 1 shows a first drywall anchor according to the invention in a perspective view.

FIGS. 1 to 5 show a drywall anchor 1 according to the invention to be screwed into a gypsum plaster gypsum plaster board (not shown) in a self-drilling manner. The drywall anchor 1 according to the invention includes a base body 2, an external thread 3, and a drilling element 4.

The drywall anchor 1 extends from a rear end to a front end along a longitudinal axis 5, which is also the longitudinal axis 5 of the base body 2 and of the drilling element 4. At the rear end, the base body 2 includes a tool holder 6 for a turning tool (not shown), for example a holder for a cross recess bit. In the interior of the base body 2, in the direction of the longitudinal axis 5 to the front toward the drilling element 4, a screw channel adjoins the tool holder 6, which in the exemplary embodiment does not extend through the entire length of the base body 2, but ends with a slit 7, which penetrates the base body 2 radially with respect to the longitudinal axis 5, at a distance in front of the front end of the base body 2. A screw (not shown) can be screwed into the screw channel for fastening an attachment part such as a hook (not shown).

The base body 2 essentially has a non-circular, prismatic cross-section over the entire length thereof. The basic shape of the base body 2 is a prism having six planar lateral surfaces. The non-circular base body provides a milling and widening function which operates differently than a mere cylindrical shaft. A peripheral flange 8 is disposed at the rear end of the base body 2, which, on the circumference, has six straight sides and includes several parallel-extending anti-rotation ribs 9 on the front side thereof. After the drywall anchor 1 according to the invention has been installed as intended into a gypsum plaster board, the flange 8 rests with the underside thereof against a visible side of the gypsum plaster board and serves as a bearing surface for the attachment part. So as to prevent the drywall anchor 1 from rotating along with the screw during removal of the attachment part, during which the screw is unscrewed from the screw channel, such as to be undesirably unscrewed from the drill hole, the anti-rotation ribs 9, when installed as planned, cut into the visible side of the gypsum plaster board.

The external thread 3 Is Integrally connected to the circumferential surface of the base body 2. The thread extends helically around the longitudinal axis 5 and is designed as a kind of V-thread for cutting into the gypsum plaster board. The external thread 3 has a maximum thread height, which approximately corresponds to 0.4 times the outside diameter of the base body 2 at the rear end of the external thread 3.

The drilling element 4 adjoins the front end of the base body 2. The drilling element 4 includes a drilling tip 10, a cutting element 11, and a hollow, crucible-shaped core bit 12, which is open toward the front and is hollow cylindrical, within which the cutting element 11 is disposed.

The drilling tip 10 forms the front end of the drywall anchor 1. The drilling tip is designed as a cone 13, which transitions into a cylinder 14 of the cutting element 11. The cone 13 and the cylinder 14 extend concentrically with respect to the longitudinal axis 5. The drilling tip 10 is designed in one piece with the cutting element 11. At the front end, the cutting element 11 includes a cutting bit 15 including a first cutting section 16 and a second cutting section 17. The two cutting sections 16, 17 extend from radially inside to radially outside, based on the longitudinal axis 5 and proceeding from the drilling tip 10, which is to say they are forwardly inclined with respect to the longitudinal axis 5. The front ends of the two cutting sections 16, 17 transition into the drilling tip 10. The outer, rear ends of the two cutting sections 16, 17 transition in one piece into an inner wall 18 of the hollow-cylindrical core bit 12, so that the cutting bit 15 is connected to the inner wall 18. The cutting bit 15 protrudes to the front beyond the front end of the core bit 12.

Figure 2:
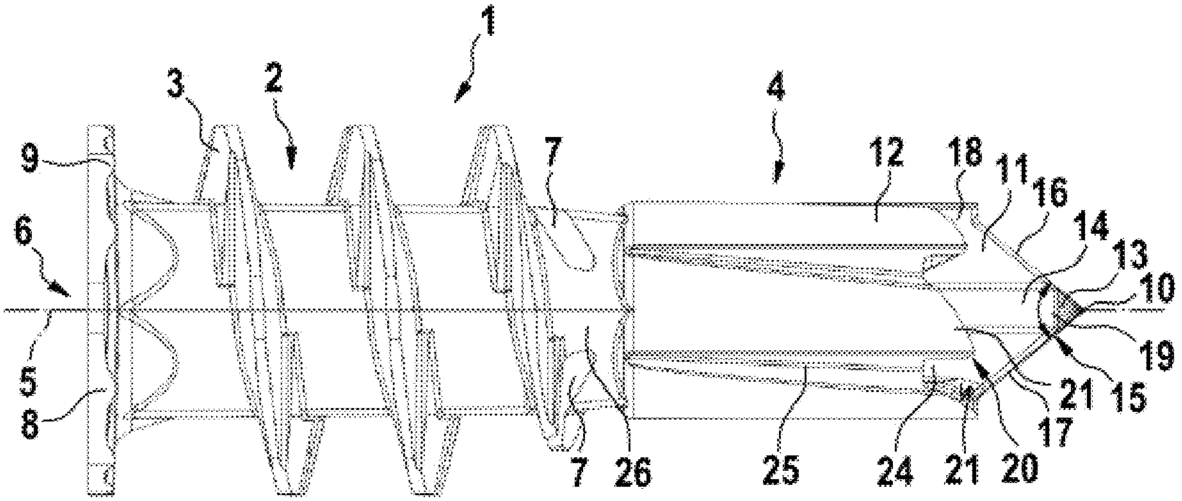
FIG. 2 shows the first drywall anchor according to the invention in a side view.
Figure 3:
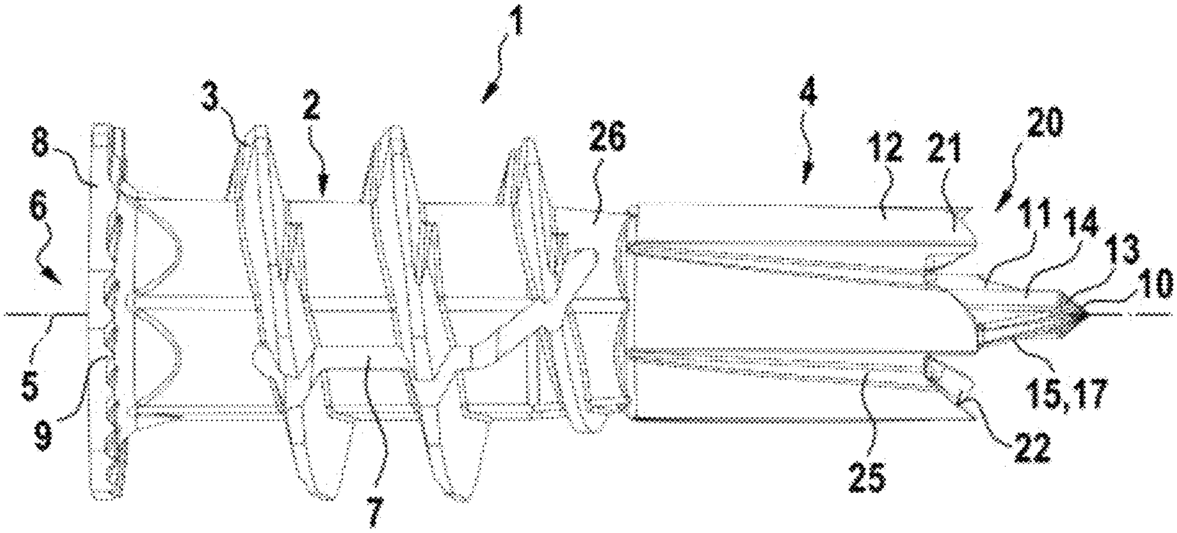
FIG. 3 shows the first drywall anchor according to the invention, which is rotated about the longitudinal axis compared to FIG. 2 in a side view.
Figure 4:
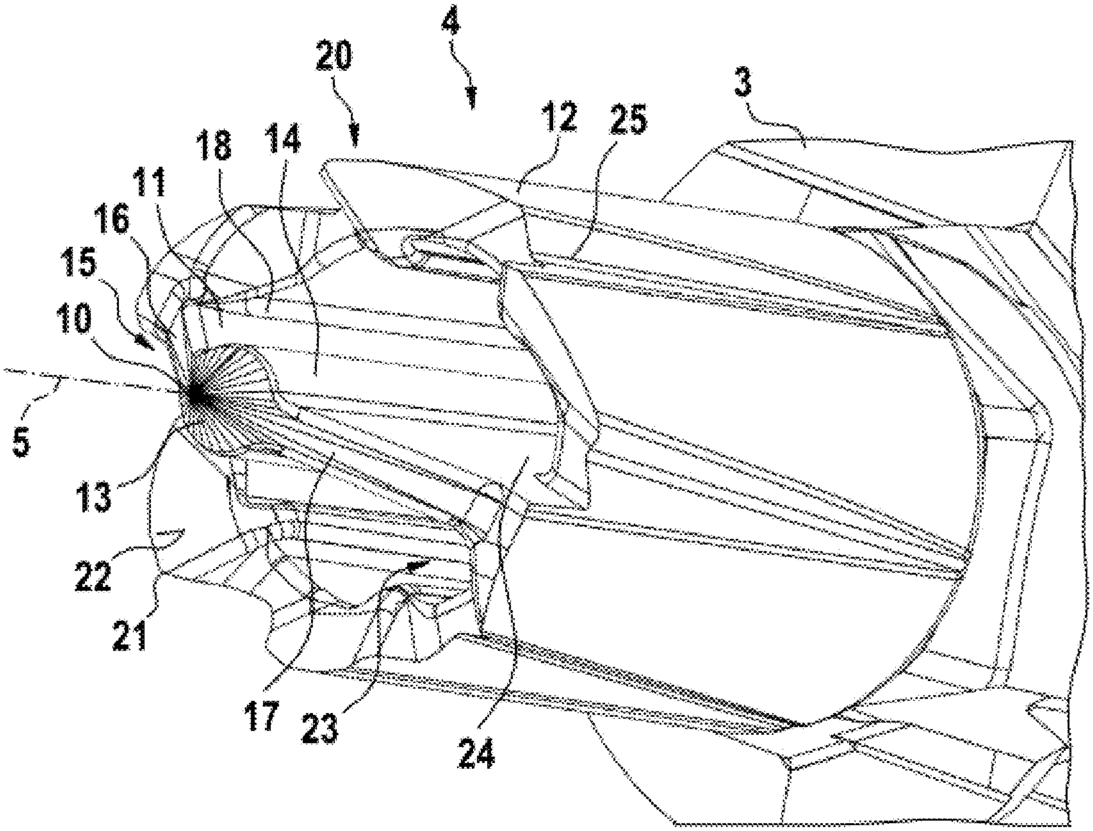
FIG. 4 shows the drilling element of the first drywall anchor according to the invention in a first perspective view.
Figure 5:
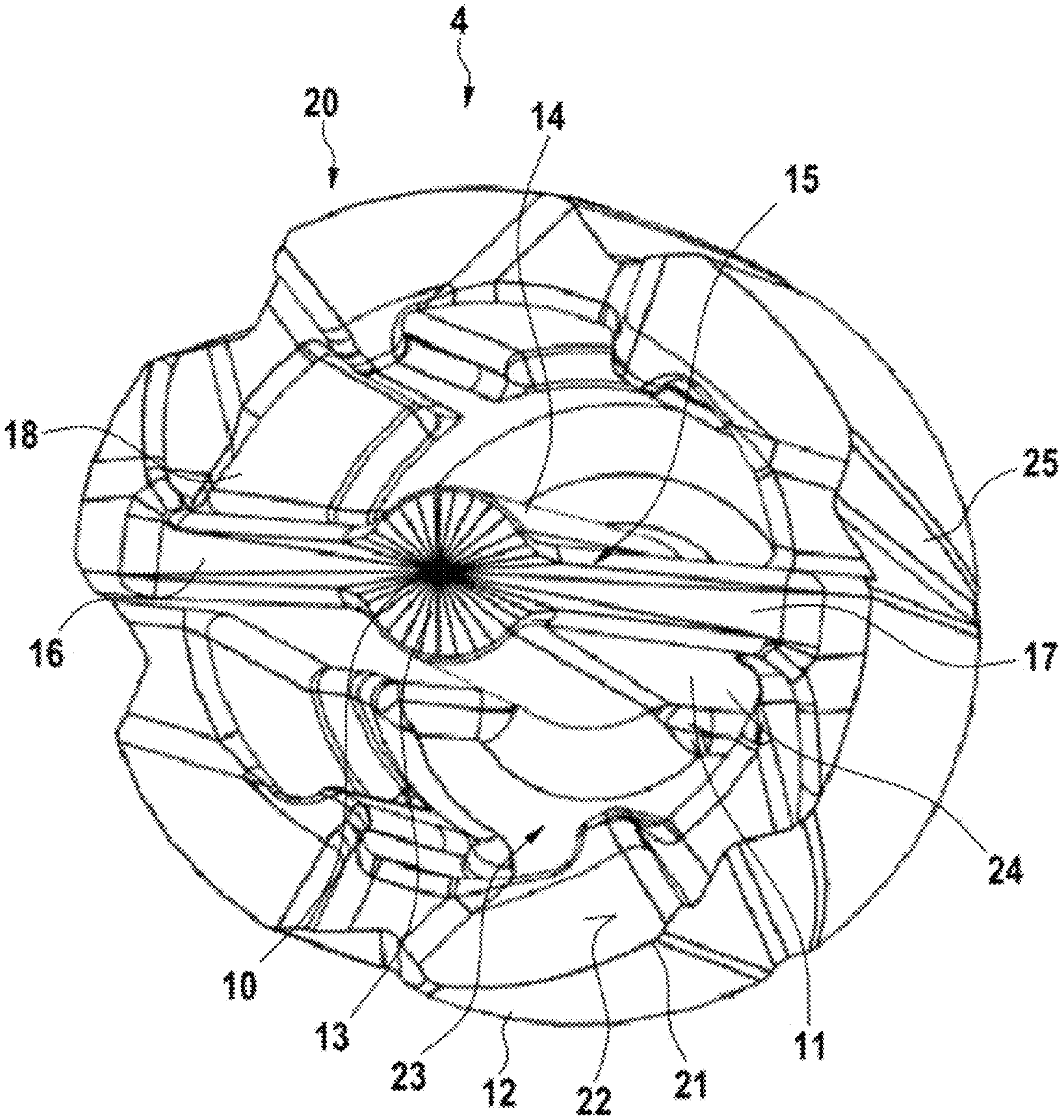
FIG. 5 shows the drilling element of the first drywall anchor according to the invention in a second perspective view which is rotated compared to FIG. 4.

The protruding part of the cutting bit 5, as is apparent in FIG. 2, forms a triangular area in an axial plane with respect to the longitudinal axis 5, this being in the shape of an isosceles triangle in the exemplary embodiment. The two cutting sections 16, 17 form the same sides of the triangle that come together in the drilling tip 10 forming the front end of the triangle. The two cutting sections 16, 17 are designed inclined with respect to the longitudinal axis 5 and symmetrically thereto.

Together, the sections include an acute angle 19 of the cutting element 11, which is 80 degrees in the exemplary embodiment. The length of the base of the triangle corresponds to the outside diameter of the cutting bit 15 which is thus smaller than the outer diameter of the bit 12.

The core bit 12 itself is designed as a hole saw including an annular saw blade 20 having six saw teeth 21. The front ends of the saw teeth 21 form the front end of the core bit 12. Each saw tooth 21 includes a cutting surface 22, which is inwardly inclined, so as to guide material, such as drill dust, removed during drilling into an interior space 23 of the hollow-cylindrical core bit 12. This interior space 23 of the core bit 12 is closed toward the base body 2 so that material that is removed by the cutting element 11 and/or by the saw teeth 21 of the core bit 12 when a drill hole is drilled into a gypsum plaster board is received in the interior space 23 of the core bit 12, without this material being able to exit the drywall anchor 1 toward the rear into the slit 7 and via the tool holder 6. In the interior space 23 of the core bit 12, the protruding triangle of the cutting element 11 transitions into a wall 24 of the cutting element 11, which divides an interior space 23 of the core bit 12 into two chambers. At the cylindrical jacket-shaped outer surface, the core bit 12 includes six groove-like pockets 25 having a V-shaped cross-section, which narrow toward the rear in the circumferential direction and, at the front ends, in each case start between two saw teeth 21. These groove-like pockets 25 are milling elements and improve the cutting behavior of the core bit 12. Moreover, the pockets 25 can receive removed material and transport it into the drill hole.

For installing the drywall anchor 1 according to the invention so as to create a fastening system, which includes the drywall anchor 1 and a gypsum plaster board, which is not shown, the drywall anchor 1 according to the invention is placed with the tool holder 6 onto a bit of a turning tool, for example a cordless screwdriver (not shown) and pushed with the core bit 12 against a visible side of the gypsum plaster board. When the drywall anchor 1 according to the invention is turned, the two cutting sections 16, 17 of the cutting element 11 initially cut open the cardboard of the visible side of the gypsum plaster board, and subsequently mill off the surface of the gypsum of the gypsum plaster board until the saw teeth 21 of the hollow-cylindrical drill 12 cut into the gypsum. The core bit 12 of the drilling element 4 thus recuts the drill hole that is drilled into the gypsum plaster board by way of the cutting element 11 of the drilling element 4. The material removed during drilling and recutting, for example drill dust, is at least partially guided from the cutting surfaces 22 of the saw teeth 21, which are obliquely inclined to the inside, into the interior space 23 of the core bit 12. Only little material can exit the drill hole to the visible side and contaminate the environment, since the removed material is received in the interior space 23 of the hollow-cylindrical core bit 12.

After the drywall anchor 1 according to the invention has been installed as intended in the gypsum plaster board, an attachment part (not shown) can be fastened to the drywall anchor 1 by way of a screw (not shown). For this purpose, the screw is screwed into the screw channel. The screw reaches the region of the screw channel in which the slit 7 is also situated. In a rear section, the slit 7 extends parallel to the longitudinal axis 5, while extending transversely thereto in a front section, and ends in front of a predetermined breaking point 26, which is formed in the front section of the base body 2. When the screw, which is screwed into the screw channel in the direction of the longitudinal axis 5, meets with the transversely extending part of the slit 7, the two parts of the base body 2 split by the slit 7 are pushed apart radially with respect to the longitudinal axis 5, whereupon the predetermined breaking point 26 breaks. These two parts form a first spreading body and a second spreading body, which are pushed against the drill hole wall as a result of spreading and/or latchingly engage the rear side of the gypsum plaster board, whereby the seating and retention of the drywall anchor 1 in the drill hole are improved. The external thread 3 is interrupted in the region of the slit 7 so that the external thread 3 does not impair spreading.

The drywall anchor 1 according to the Invention can be easily Installed In a gypsum plaster board, wherein, due to the design according to the invention of the drywall anchor 1, only a little removed material, such as drill dust, makes its way out of the drill hole to the outside.

The drywall anchor 1 according to the invention is integrally produced from a plastic material in an injection molding process, for example from a polyamide. The drilling element 4, the flange 8, and the external thread 3 are thus each integrally connected to the base body 2. In principle, it is also possible to produce, for example, the drilling element 4 or parts thereof, for example the cutting element 11, from another material and/or another plastic material. For example, the cutting element 11 can be made of a hard, fiber-reinforced polyamide instead of unreinforced polyamide, and the entire drywall anchor 1 according to the invention can be molded in a two-component injection molding process.

Figure 6:
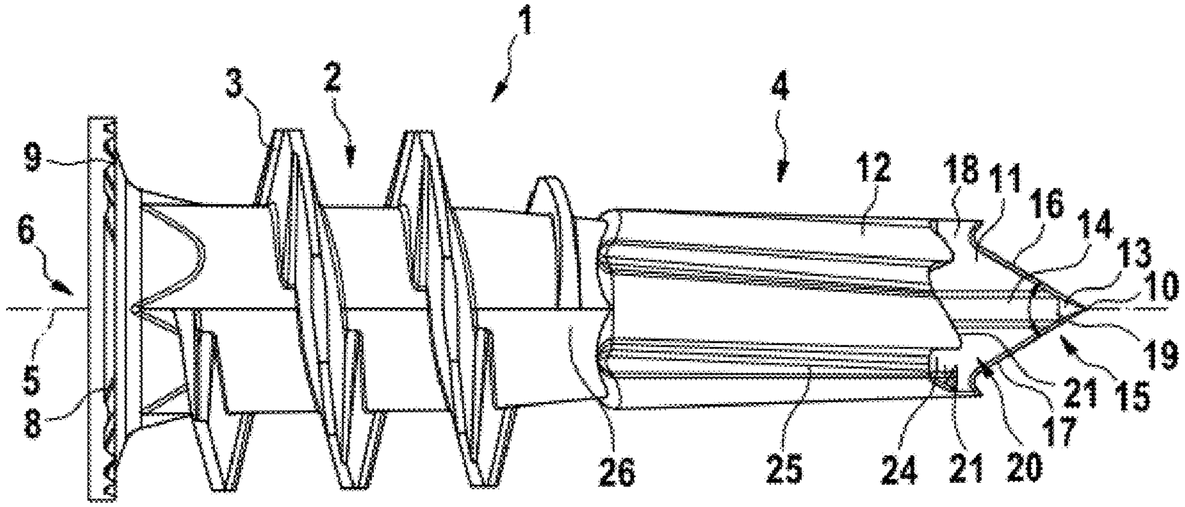
FIG. 6 shows a second drywall anchor according to the invention in a side view.

The second drywall anchor 1 according to the invention shown in FIG. 6 essentially differs from the first exemplary embodiment in the design of the drilling element 4, the two cutting sections 16, 17 of which include an acute angle 19 of approximately 60 degrees. This drywall anchor 1 according to the invention can thus already be pushed into the gypsum plaster board by the user prior to drilling and, as a result, the gap between the core bit 12 and the gypsum plaster board, through which removed material can find its way to the outside, can be reduced. Moreover, the outer surface of the core bit 12 is not have cylindrical jacket-shaped but rather has a conical design, here in the shape of the jacket of a truncated cone. The tapered or frustoconical shape of the non-circular region serves to widen the hole as a drill hole is drilled into the gypsum plaster board by the drilling element. In addition, the tapered structure provides improved holding function which operates differently than a standard and generally cylindrical shaft. In the exemplary embodiment, the truncated cone is rotationally symmetrical with respect to the longitudinal axis 5, and the jacket surface is inclined approximately 5 degrees with respect to the longitudinal axis 5, which is to say has a cone angle of approximately 10 degrees. At the front end, the core bit 12 thus has a reduced cross-section compared to the first exemplary embodiment, so that less material is detached from the gypsum plaster board when tapped by way of the core bit 12. The subsequent reaming of the drill hole is then carried out by means of the pockets 25 of the core bit 12 acting as milling elements. The amount of removed material that makes its way out of the drill hole to the outside during the installation of the second drywall anchor 1 according to the invention is reduced even further by this design, compared to the anchor of the first exemplary embodiment.

The invention claimed is:

1. A drywall anchor to be introduced into a gypsum plaster board in a self-drilling manner, comprising a base body and a drilling element, the drywall anchor extending from a rear end to a front end along a longitudinal axis, the drilling element comprising a drilling tip and a cutting element including a cutting bit, and the cutting bit extending from radially inside to radially outside based on the longitudinal axis, wherein the drilling element comprises a hollow, crucible-shaped core bit that is open toward the front and within which the cutting element is disposed; and in that the cutting bit of the cutting element protrudes to the front beyond the front end of the core bit, wherein the cutting bit is connected to an inner wall of the core bit.

2. The drywall anchor according to claim 1, wherein the cutting bit comprises two cutting sections, each extending from radially inside to radially outside based on the longitudinal axis.

3. The drywall anchor according to claim 1, wherein the cutting element has a triangular design in the region of the cutting bit in an axial plane with respect to the longitudinal axis.

4. The drywall anchor according to claim 1, wherein the cutting bit transitions into the drilling tip at the front end thereof.

5. The drywall anchor according to claim 2, wherein the two cutting sections are inclined with respect to the longitudinal axis so as to enclose, together, an angle of between 30 degrees and 120 degrees in an axial plane with respect to the longitudinal axis.

6. The drywall anchor according to claim 1, wherein the cutting bit has an outside diameter that is smaller than the outside diameter of the core bit.

7. The drywall anchor according to claim 1, wherein the cutting element forms a wall that divides an interior space of the core bit into two chambers.

8. The drywall anchor according to claim 1, wherein the core bit comprises an interior space that is closed toward the base body.

9. The drywall anchor according to claim 1, wherein the core bit has a cylinder jacket-shaped outer surface or a conical outer surface.

10. The drywall anchor according to claim 9, wherein the core bit further comprises at least one milling element at the outer surface thereof, including at least two groove-like pockets.

11. The drywall anchor according to claim 1, wherein the core bit is a hole saw including an annular saw blade having at least two saw teeth.

12. The drywall anchor according to claim 1, wherein the core bit includes at least two saw teeth, wherein the at least two saw teeth include cutting surfaces that are inwardly inclined.

13. The drywall anchor according to claim 1, wherein the base body includes a non-circular cross-section over the entire length thereof.

14. The drywall anchor according to claim 1, wherein the base body includes a conical outer surface proximal to a peripheral flange.

15. A method for installing a drywall anchor according to claim 1 for creating a fastening system which comprises the drywall anchor and a gypsum plaster board, wherein a drill hole is drilled into the gypsum plaster board by way of the cutting element of the drilling element when the drywall anchor is being introduced into the gypsum plaster board, wherein the drill hole is recut thereafter by way of the core bit of the drilling element.

16. The method according to claim 15, wherein material removed when the drill hole is being drilled and recut is received in an interior space of the core bit.

17. A drywall anchor to be introduced into a gypsum plaster board in a self-drilling manner, comprising a base body and a drilling element, the drywall anchor extending from a rear end to a front end along a longitudinal axis, the drilling element comprising a drilling tip and a cutting element including a cutting bit, and the cutting bit extending from radially inside to radially outside based on the longitudinal axis, wherein the drilling element comprises a hollow, crucible-shaped core bit that is open toward the front and within which the cutting element is disposed; and in that the cutting bit of the cutting element protrudes to the front beyond the front end of the core bit, and wherein the cutting element forms a wall that divides an interior space of the core bit into two chambers.

* * * * *